United States Patent
Zhou et al.

(10) Patent No.: US 9,103,955 B2
(45) Date of Patent: Aug. 11, 2015

(54) BACKLIGHT MODULE WITH LIGHT GUIDE PLATE WITH LIGHT SOURCES, AND LIQUID CRYSTAL DISPLAY APPARATUS WITH SUCH MODULE

(75) Inventors: Gege Zhou, Shenzhen (CN); Kuojun Fang, Shenzhen (CN)

(73) Assignee: SHENZHEN CHINA START OPTOELECTRONICS TECHNOLOGY CO., LTD., Guangdong (CN)

( * ) Notice: Subject to any disclaimer, the term of this patent is extended or adjusted under 35 U.S.C. 154(b) by 475 days.

(21) Appl. No.: 13/502,129

(22) PCT Filed: Mar. 14, 2012

(86) PCT No.: PCT/CN2012/072288
§ 371 (c)(1),
(2), (4) Date: Apr. 14, 2012

(87) PCT Pub. No.: WO2013/134933
PCT Pub. Date: Sep. 19, 2013

(65) Prior Publication Data
US 2013/0235300 A1 Sep. 12, 2013

(51) Int. Cl.
G02F 1/1335 (2006.01)
F21V 8/00 (2006.01)

(52) U.S. Cl.
CPC ............ *G02B 6/0068* (2013.01); *G02B 6/0073* (2013.01)

(58) Field of Classification Search
USPC ...................... 349/65; 362/613, 268
See application file for complete search history.

(56) References Cited

U.S. PATENT DOCUMENTS

| 2009/0016057 A1* | 1/2009 | Rinko | 362/268 |
| 2012/0050649 A1* | 3/2012 | Yeo | 349/65 |
| 2013/0258716 A1* | 10/2013 | Fang | 362/613 |

* cited by examiner

*Primary Examiner* — Huyen Ngo

(57) ABSTRACT

The present invention provides a backlight module and a liquid crystal display apparatus. A light guide plate of the backlight module comprises hollow structures. Each of the hollow structures corresponds to one of the light sources and comprises two air layers with an included angle there-between, and the two air layers are a first hollow layer and a second hollow layer. A normal direction is vertical to the light-incident surface, and there is a first oblique angle between the first hollow layer and the normal direction, and there is a second oblique angle between the second hollow layer and the normal direction, and a depth of the hollow structures satisfies a predetermined equation.

7 Claims, 3 Drawing Sheets

BACKLIGHT MODULE WITH LIGHT GUIDE PLATE WITH LIGHT SOURCES, AND LIQUID CRYSTAL DISPLAY APPARATUS WITH SUCH MODULE

FIELD OF THE INVENTION

The present invention relates to a field of a liquid crystal display (LCD) technology, and more particularly to a backlight module and a liquid crystal display apparatus.

BACKGROUND OF THE INVENTION

In accordance with a development of lightening and thinning LCDs, an amount of light emitting diodes (LEDs) required for backlight is reduced.

Referring to FIG. 1, in a side-light type backlight module, the amount of the LEDs is reduced, resulting in an increase of a distance P' between the LEDs. Since a density of a light guide plate 12' is different to a density of air, normally less than the density of air, a refraction of light rays arises when the light rays are emitted from the LEDs 11' into the light guide plate 12'.

When the light rays are emitted form the LEDs 11', a portion of the light rays is normally incident to the light guide plate 12', and the normally incident light rays have an angle $\theta_{air}$ of 90 degrees. When entering the light guide plate 12', the light rays have a reflection angle $\theta LGP=\arcsin(1/nLGP)$, and angle $\theta LGP$ is less than 90 degrees.

Concerning the normally incident light, when a light mixing distance d is constant, and the angle $\theta LGP$ is reduced, the light rays will be only distributed in specific regions of the light guide plate 12', resulting in a hotspot problem of an uneven brightness distribution.

As a result, it is necessary to provide a backlight module and a liquid crystal display apparatus to solve the problems existing in the conventional technologies, as described above.

SUMMARY OF THE INVENTION

A primary object of the present invention is to provide a backlight module, so as to solve the problem of uneven brightness distribution in the conventional light guide plate.

For solving the above-mentioned problem, the present invention provides a backlight module, and the backlight module comprises: light sources; a light guide plate including a light-incident surface and hollow structures disposed therein, wherein the light sources are close to the light-incident surface of the light guide plate, and the hollow structures correspond to the light sources and comprise two air layers with an included angle there-between, and the two air layers are a first hollow layer and a second hollow layer; wherein a normal direction is vertical to the light-incident surface, and there is a first oblique angle between the first hollow layer and the normal direction, and there is a second oblique angle between the second hollow layer and the normal direction; wherein the first oblique angle $\beta 1$ satisfies the below equation: $\beta 1<45°-\theta LGP/2$; wherein the second oblique angle $\beta 2$ satisfies the below equation: $\beta 2<45°-\theta LGP/2$; wherein $\theta LGP$ indicates a refraction angle of light rays which are emitted into the light guide plate along the normal direction.

In the backlight module of the present invention, the first hollow layer and the second hollow layer are hollow plane layers or hollow curved layers.

In the backlight module of the present invention, the hollow structures have a hollow depth D along a thickness direction of the light guide plate, and there is a minimum distance L between the hollow structures and a light-mixing line of the backlight module, and the light rays have a minimum refraction angle $\delta$ on the light-mixing line, and the hollow depth D, the minimum distance L and the minimum refraction angle $\delta$ satisfy the below equation: $\sin \delta \le nLGP \times \sin(\operatorname{atan}(L/D))$, wherein nLGP indicates a refractive index of the light guide plate.

Another object of the present invention is to provide a backlight module, so as to solve the problem of uneven brightness distribution in the conventional light guide plate.

For solving the above-mentioned problem, the present invention provides a backlight module, and the backlight module comprises: light sources; a light guide plate including a light-incident surface and hollow structures disposed therein, wherein the light sources are close to the light-incident surface of the light guide plate, and the hollow structures correspond to the light sources and comprise two air layers with an included angle there-between, and the two air layers are a first hollow layer and a second hollow layer; wherein a normal direction is vertical to the light-incident surface, and there is a first oblique angle between the first hollow layer and the normal direction, and there is a second oblique angle between the second hollow layer and the normal direction.

In the backlight module of the present invention, the first oblique angle $\beta 1$ satisfies the below equation: $\beta 1<45°-\theta LGP/2$, wherein $\theta LGP$ indicates a refraction angle of light rays which are emitted into the light guide plate along the normal direction.

In the backlight module of the present invention, the second oblique angle $\beta 2$ satisfies the below equation: $\beta 2<45°-\theta LGP/2$, wherein $\theta LGP$ indicates a refraction angle of light rays which are emitted into the light guide plate along the normal direction.

In the backlight module of the present invention, the first hollow layer and the second hollow layer are hollow plane layers or hollow curved layers.

In the backlight module of the present invention, the hollow structures have a hollow depth D along a thickness direction of the light guide plate, and there is a minimum distance L between the hollow structures and a light-mixing line of the backlight module, and the light rays have a minimum refraction angle $\delta$ on the light-mixing line, and the hollow depth D, the minimum distance L and the minimum refraction angle $\delta$ satisfy the below equation: $\sin \delta \le nLGP \times \sin(\operatorname{atan}(L/D))$, wherein nLGP indicates a refractive index of the light guide plate.

Still another object of the present invention is to provide a liquid crystal display apparatus, so as to solve the problem of uneven brightness distribution in the conventional light guide plate.

For solving the above-mentioned problem, the present invention provides a liquid crystal display apparatus comprising a backlight module. The the backlight module comprises: light sources; a light guide plate including a light-incident surface and hollow structures disposed therein, wherein the light sources are close to the light-incident surface of the light guide plate, and the hollow structures correspond to the light sources and comprise two air layers with an included angle there-between, and the two air layers are a first hollow layer and a second hollow layer; wherein a normal direction is vertical to the light-incident surface, and there is a first oblique angle between the first hollow layer and the normal direction, and there is a second oblique angle between the second hollow layer and the normal direction.

In the liquid crystal display apparatus of the present invention, the first oblique angle $\beta 1$ satisfies the below equation:

β1<45°−θLGP/2, wherein θLGP indicates a refraction angle of light rays which are emitted into the light guide plate along the normal direction.

In the liquid crystal display apparatus of the present invention, the second oblique angle β2 satisfies the below equation: β2<45°−θLGP/2, wherein θLGP indicates a refraction angle of light rays which are emitted into the light guide plate along the normal direction.

In the liquid crystal display apparatus of the present invention, the first hollow layer and the second hollow layer are hollow plane layers or hollow curved layers.

In the liquid crystal display apparatus of the present invention, the hollow structures have a hollow depth D along a thickness direction of the light guide plate, and there is a minimum distance L between the hollow structures and a light-mixing line of the backlight module, and the light rays have a minimum refraction angle δ on the light-mixing line, and the hollow depth D, the minimum distance L and the minimum refraction angle δ satisfy the below equation: sin δ≤nLGP×sin(atan(L/D)), wherein nLGP indicates a refractive index of the light guide plate.

Compared with the conventional technology, in the present invention, the hollow structures are formed in the light guide plate corresponding to the light sources, and the hollow structures comprise two air layers with an included angle there-between, and the two air layers are a first hollow layer and a second hollow layer. The normally incident light rays can be reflected by the hollow structures, so as to scatter the light rays, thereby preventing that the light rays are only distributed in specific regions of the light guide plate, and avoiding the problem of uneven brightness distribution to enhance the display quality of the LCD apparatus.

The structure and the technical means adopted by the present invention to achieve the above and other objects can be best understood by referring to the following detailed description of the preferred embodiments and the accompanying drawings:

DETAILED DESCRIPTION OF THE PREFERRED EMBODIMENTS

The following embodiments are exemplified by referring to the accompanying drawings, for describing specific embodiments implemented by the present invention.

Figure 2:
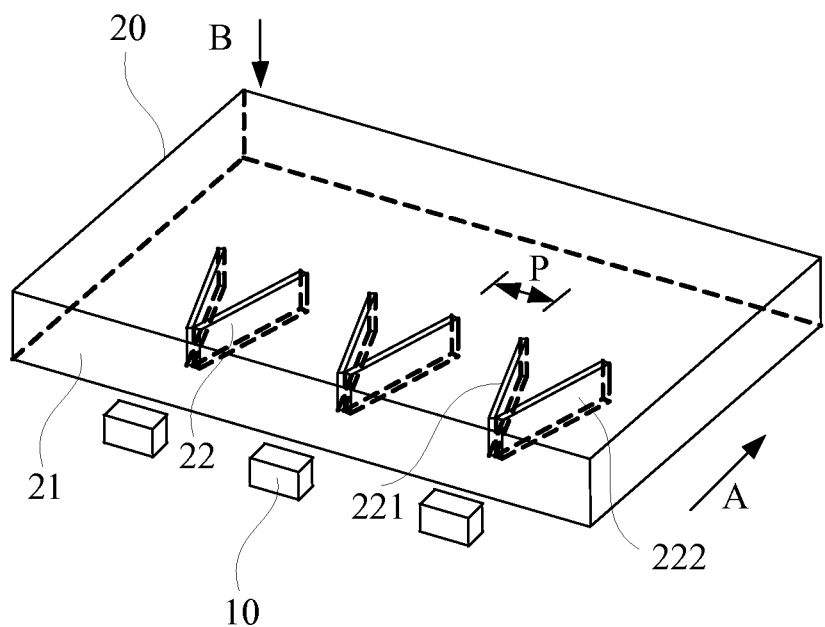
FIG. 2 is a structural diagram showing a backlight module according to a first preferred embodiment of the present invention.

Referring to FIG. 2, FIG. 2 is a structural diagram showing a backlight module according to a first preferred embodiment of the present invention.

The backlight module comprises light sources 10 and a light guide plate 20. The light guide plate 20 includes a light-incident surface 21 and hollow structures 22 disposed therein. The hollow structures 22 comprise a first hollow layer 221 and a second hollow layer 222 disposed opposite thereto.

In the first preferred embodiment, as shown in FIG. 2, the first hollow layer 221 and the second hollow layer 222 have an included angle there-between, and are hollow plane layers with air layers therein. The first hollow layer 221 and the second hollow layer 222 are vertical to a light emitting surface and parallel to a thickness direction B of the light guide plate 20.

Figure 3:
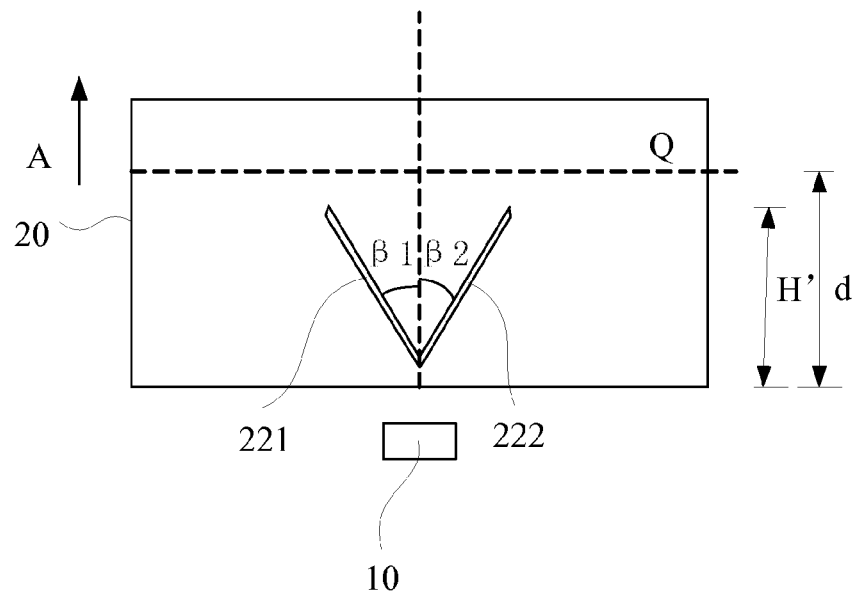
FIG. 3 is a top view of FIG. 2.

Referring to FIG. 3, in a normal direction A (i.e. an incident direction of the light rays) vertical to the light-incident surface 21, the first hollow layer 221 has a first oblique angle β1, and the second hollow layer 222 has a second oblique angle β2. In this case, the first oblique angle β1 is opposite to the second oblique angle β2. Specifically, the first oblique angle β1 is formed between the normal direction A and the first hollow layer 221, and the second oblique angle β2 is formed between the normal direction A and the second hollow layer 222.

Figure 1:
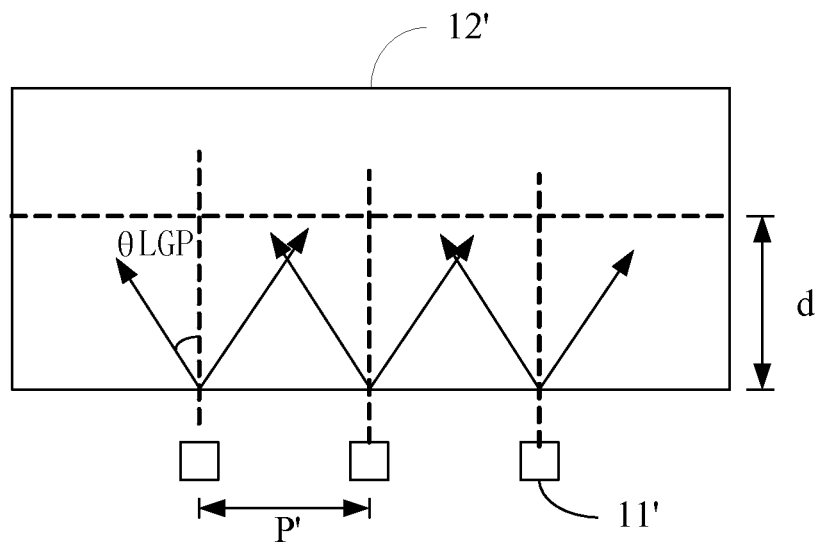
FIG. 1 is a structural diagram showing a conventional backlight module.

More specifically, the light rays which are emitted into the light guide plate 20 along the normal direction A have a refraction angle θLGP (not shown in FIG. 2 and referring to FIG. 1), and the first oblique angle β1 satisfies the below equation (1):

$$\beta1<45°-\theta LGP/2 \qquad (1).$$

Under this condition, the first hollow layer 221 can reflect the light rays, wherein the light rays are emitted from the light sources 10 corresponding to the hollow structures 22. Furthermore, the light rays are normally incident on the light-incident surface 21, and are refracted through the light-incident surface 21. Subsequently, the light rays can be reflected by the first hollow layer 221 of the hollow structures 22, thereby scattering the light rays for enlarging a distribution of the incident light. Therefore, it is avoidable that the light rays are only distributed in specific regions of the light guide plate 20.

In this case, a refractive index of the light guide plate 20 can be greater than √2, and the maximum magnitude of the first oblique angle β1 can be of 22.5 degrees.

More specifically, the second oblique angle β2 satisfies the below equation (2):

$$\beta2<45°-\theta LGP/2 \qquad (2).$$

Under this condition, the second hollow layer 222 can reflect the light rays, wherein the light rays are emitted from the light sources 10 corresponding to the hollow structures 22. Furthermore, the light rays are normally incident on the light-incident surface 21, and are refracted through the light-incident surface 21. Subsequently, the light rays can be reflected by the second hollow layer 222 of the hollow structures 22, thereby scattering the light rays for enlarging a distribution of the incident light. Therefore, it is avoidable that the light rays are only distributed in specific regions of the light guide plate 20. In this case, the maximum magnitude of the second oblique angle β2 can be of 22.5 degrees.

Referring to FIG. 3 again, a maximum distance H between the hollow structures 22 and the light-incident surface 21 of the light guide plate 20 is less than a light mixing distance d of the backlight module. The hollow structures 22 have a reflection length H' along the direction A, and the reflection length H' is less than the light mixing distance d of the backlight module, so as to ensure the hollow structures 22 to reflect the light rays before mixing light.

Figure 4:
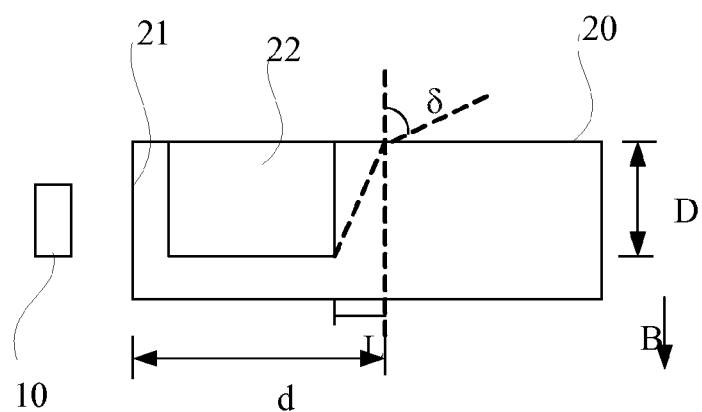
FIG. 4 is a side view of FIG. 2.

Referring to FIG. 4, FIG. 4 is a side view showing the backlight module shown in FIG. 2 according to the preferred embodiment.

The hollow structures 22 have a hollow depth D along the direction B, and there is a minimum distance L between the hollow structures 22 and a light-mixing line Q, where the light rays of the adjacent light sources are mixed, of the backlight module. The light rays reflected by the hollow structures 22 have a minimum refraction angle δ on the light-mixing line Q. The hollow depth D, the minimum distance L and the minimum refraction angle δ can satisfy the below equation (3):

$$\sin \delta \leq nLGP \times \sin(\operatorname{atan}(L/D)) \quad (3).$$

In this case, nLGP indicates the refractive index of the light guide plate.

By satisfying the above-mentioned equation (3) of the hollow depth D, the minimum distance L and the minimum refraction angle δ, it is avoidable to view the hollow structures 22 at the viewing angle δ for enhancing a backlight quality.

In the embodiment as shown in FIG. 4, the hollow depth D is less than a thickness of the light guide plate 20. In one embodiment, the hollow depth D may equal to the thickness of the light guide plate 20, which are not enumerated herein.

In this embodiment, the first oblique angle β1, the second oblique angle β2, the reflection length H and positions of the light sources 10 can be adjustable, so as to improve the problem of an uneven brightness distribution.

In this case, the reflection length H', a space P between the two adjacent hollow structures 22 and the first oblique angle β1 or the second oblique angle β2 can satisfy the below equations:

$$\tan \beta 1 < P/2H',$$

or $$\tan \beta 2 < P/2H'.$$

By satisfying the above-mentioned equations, it is avoidable that the light rays are reflected from one of the hollow structures 22 to another one thereof.

The light transmission of the first preferred embodiment as shown in FIG. 2 to FIG. 4 is described below.

Figure 5:
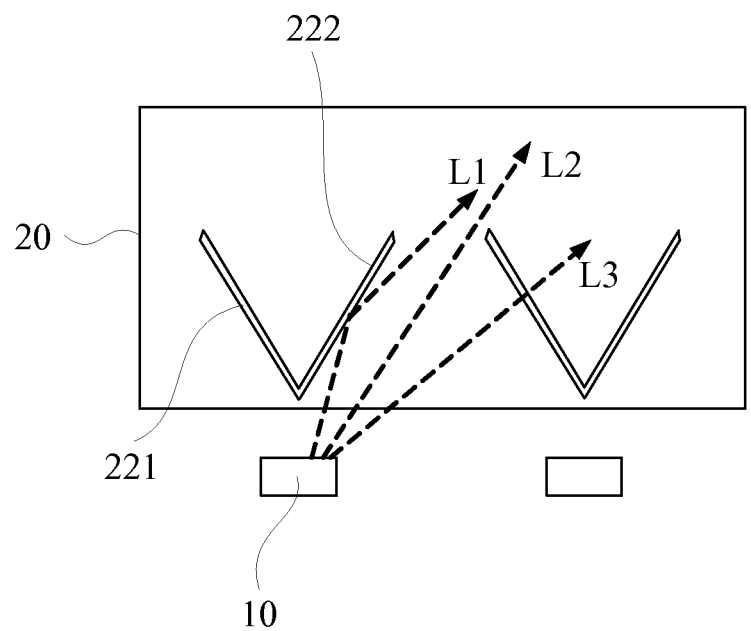
FIG. 5 is a schematic diagram showing light rays reflected by hollow structures as shown in FIG. 2.

Referring to FIG. 5, in this embodiment, the first hollow layer 221 and the second hollow layer 222 are formed as a V-shaped structure. The light rays are emitted from the light sources 10 to the light guide plate 20. After entering the light guide plate 20, taking the second hollow layer 222 for example, the light rays L1 of a smaller refraction angle will be totally reflected by the second hollow layer 222, and the light rays L2 passing through the space between the adjacent hollow structures 22 will directly go forward, and the light rays L3 of a larger refraction angle can be normally incident on and pass through the first hollow layer 221 or the second hollow layer 222 with a high transmittance (greater than 92%).

Apparently, the light rays can be reflected by the hollow structures 22 for scattering the light rays, thereby preventing that the light rays are only distributed in specific regions of the light guide plate, and avoiding the problem of uneven brightness distribution.

Figure 6:
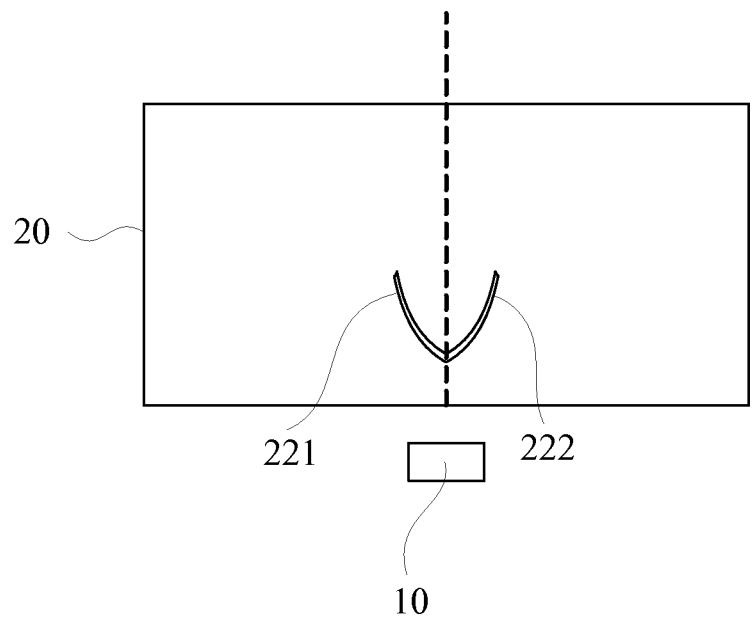
FIG. 6 is a top view showing a backlight module according to a second preferred embodiment of the present invention

Referring to FIG. 6, FIG. 6 is a top view showing a backlight module according to a second preferred embodiment of the present invention.

In the second preferred embodiment, the first hollow layer 221 and the second hollow layer 222 can be curved layers. Specifically, the first hollow layer 221 and the second hollow layer 222 can be parabolic structures or U-shaped structures. An angle βi (not shown) is formed between a tangent of the parabolic structures and the direction A, wherein the angle βi is equal to or less than the oblique angle β, so as to prevent that the light rays are reflected back to the light-incident surface 21 of the light guide plate 20 by the hollow structures 22.

The light transmission of the second preferred embodiment as shown in FIG. 6 is similar to the light transmission of the first preferred embodiment as shown in FIG. 2 to FIG. 4, and the similarities are not mentioned for simplification.

The present invention further provides a liquid crystal display (LCD) apparatus. The LCD apparatus comprises a liquid crystal display panel (not shown) and the backlight module provided by the present invention. The backlight module is described above, and will not be mentioned herein for simplification.

With the use of the hollow structures comprising the first hollow layer and the second hollow layer and formed in the light guide plate, the normally incident light rays can be reflected by the hollow structures, so as to scatter the light rays, thereby preventing that the light rays are only distributed in specific regions of the light guide plate, and avoiding the problem of uneven brightness distribution to enhance the display quality of the LCD apparatus.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   light sources;
   a light guide plate including a light-incident surface and hollow structures disposed therein, wherein the light sources are close to the light-incident surface of the light guide plate, and each of the hollow structures corresponds to one of the light sources and comprises two air layers with an included angle there-between, and the two air layers are a first hollow layer and a second hollow layer;
   wherein a normal direction is vertical to the light-incident surface, and there is a first oblique angle between the first hollow layer and the normal direction, and there is a second oblique angle between the second hollow layer and the normal direction;
   wherein the first oblique angle β 1 satisfies the below equation:

$$\beta 1 < 45° - \theta LGP /2;$$

wherein the second oblique angle β 2 satisfies the below equation:

$$\beta 2 < 45° - \theta LGP /2;$$

wherein θ LGP indicates a refraction angle of light rays which are emitted into the light guide plate along the normal direction;
   wherein the hollow structures have a hollow depth D along a thickness direction of the light guide plate, and there is a minimum distance L between the hollow structures and a light-mixing line of the backlight module, and the light rays have a minimum refraction angle δ on the light-mixing line, and the hollow depth D, the minimum distance L and the minimum refraction angle δ satisfy the below equation:

$$\sin \delta \leq nLGP \times \sin (a \tan (L/D));$$

wherein nLGP indicates a refractive index of the light guide plate, and the thickness direction is parallel to the light-incident surface, and at the light-mixing line in the light guide plate, the light rays of the adjacent light sources are mixed, and the hollow depth D is a depth of the hollow structures in the light guide plate.

2. A backlight module, comprising:
light sources;
a light guide plate including a light-incident surface and hollow structures disposed therein, wherein the light sources are close to the light-incident surface of the light guide plate, and each of the hollow structures corresponds to one of the light sources and comprises two air layers with an included angle there-between, and the two air layers are a first hollow layer and a second hollow layer;
wherein a normal direction is vertical to the light-incident surface, and there is a first oblique angle between the first hollow layer and the normal direction, and there is a second oblique angle between the second hollow layer and the normal direction;
wherein the hollow structures have a hollow depth D along a thickness direction of the light guide plate, and there is a minimum distance L between the hollow structures and a light-mixing line of the backlight module, and the light rays have a minimum refraction angle $\delta$ on the light-mixing line, and the hollow depth D, the minimum distance L and the minimum refraction angle $\delta$ satisfy the below equation:

$$\sin \delta \leq nLGP \times \sin (a \tan (L/D));$$

wherein nLGP indicates a refractive index of the light guide plate, and the thickness direction is parallel to the light-incident surface, and at the light-mixing line in the light guide plate, the light rays of the adjacent light sources are mixed, and the hollow depth D is a depth of the hollow structures in the light guide plate.

3. The backlight module according to claim 2, wherein the first oblique angle $\beta 1$ satisfies the below equation:

$$\beta 1 < 45° - \theta LGP /2;$$

wherein $\theta$ LGP indicates a refraction angle of light rays which are emitted into the light guide plate along the normal direction.

4. The backlight module according to claim 2, wherein the second oblique angle $\beta 2$ satisfies the below equation:

$$\beta 2 < 45° - \theta LGP /2;$$

wherein $\theta$ LGP indicates a refraction angle of light rays which are emitted into the light guide plate along the normal direction.

5. A liquid crystal display apparatus comprising a liquid crystal display panel and a backlight module, wherein the backlight module comprises:
light sources;
a light guide plate including a light-incident surface and hollow structures disposed therein, wherein the light sources are close to the light-incident surface of the light guide plate, and each of the hollow structures corresponds to one of the light sources and comprises two air layers with an included angle there-between, and the two air layers are a first hollow layer and a second hollow layer;
wherein a normal direction is vertical to the light-incident surface, and there is a first oblique angle between the first hollow layer and the normal direction, and there is a second oblique angle between the second hollow layer and the normal direction; wherein the hollow structures have a hollow depth D along a thickness direction of the light guide plate, and there is a minimum distance L between the hollow structures and a light-mixing line of the backlight module, and the light rays have a minimum refraction angle $\delta$ on the light-mixing line, and the hollow depth D, the minimum distance L and the minimum refraction angle $\delta$ satisfy the below equation:

$$\sin \delta \leq nLGP \times \sin (a \tan (L/D));$$

wherein nLGP indicates a refractive index of the light guide plate, and the thickness direction is parallel to the light-incident surface, and at the light-mixing line in the light guide plate, the light rays of the adjacent light sources are mixed, and the hollow depth D is a depth of the hollow structures in the light guide plate.

6. The liquid crystal display apparatus according to claim 5, wherein the first oblique angle $\beta 1$ satisfies the below equation:

$$\beta 1 < 45° - \theta LGP /2;$$

wherein $\theta$ LGP indicates a refraction angle of light rays which are emitted into the light guide plate along the normal direction.

7. The liquid crystal display apparatus according to claim 5, wherein the second oblique angle $\beta 2$ satisfies the below equation:

$$\beta 2 < 45° - \theta LGP /2;$$

wherein $\theta$ LGP indicates a refraction angle of light rays which are emitted into the light guide plate along the normal direction.

* * * * *

UNITED STATES PATENT AND TRADEMARK OFFICE
CERTIFICATE OF CORRECTION

| | | |
|---|---|---|
| PATENT NO. | : 9,103,955 B2 | Page 1 of 1 |
| APPLICATION NO. | : 13/502129 | |
| DATED | : August 11, 2015 | |
| INVENTOR(S) | : Gege Zhou et al. | |

It is certified that error appears in the above-identified patent and that said Letters Patent is hereby corrected as shown below:

On The Title Page, insert (30) Foreign Application Priority Data: --March 12, 2012 (CN) 201210063179.6--.

Signed and Sealed this
Sixteenth Day of February, 2016

Michelle K. Lee
*Director of the United States Patent and Trademark Office*

UNITED STATES PATENT AND TRADEMARK OFFICE
CERTIFICATE OF CORRECTION

PATENT NO. : 9,103,955 B2  
APPLICATION NO. : 13/502129  
DATED : August 11, 2015  
INVENTOR(S) : Gege Zhou and Kuojun Fang Page 1 of 1

It is certified that error appears in the above-identified patent and that said Letters Patent is hereby corrected as shown below:

On The Title Page,

Item (73) Assignee reads "SHENZHEN CHINA START OPTOELECTRONICS TECHNOLOGY CO., LTD." should read --SHENZHEN CHINA STAR OPTOELECTRONICS TECHNOLOGY CO., LTD.--.

Insert Item --(30) Foreign Application Priority Data
March 12, 2012 (CN) 201210063179.6--.

This certificate supersedes the Certificate of Correction issued February 16, 2016.

Signed and Sealed this
Twenty-second Day of March, 2016

Michelle K. Lee
*Director of the United States Patent and Trademark Office*